(12) United States Patent
Nishikata et al.

(10) Patent No.: US 8,782,678 B2
(45) Date of Patent: Jul. 15, 2014

(54) DISK CLAMPING MECHANISM AND DISK ROTATING MOTOR PROVIDED WITH SAME

(75) Inventors: Toshiyuki Nishikata, Yonago (JP); Kumio Masuda, Yonago (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 13/499,192

(22) PCT Filed: Mar. 4, 2010

(86) PCT No.: PCT/JP2010/001497
§ 371 (c)(1),
(2), (4) Date: Mar. 29, 2012

(87) PCT Pub. No.: WO2011/043004
PCT Pub. Date: Apr. 14, 2011

(65) Prior Publication Data
US 2012/0185883 A1    Jul. 19, 2012

(30) Foreign Application Priority Data
Oct. 7, 2009 (JP) ................................ 2009-233305

(51) Int. Cl.
*G11B 17/028*    (2006.01)
*G11B 19/20*    (2006.01)

(52) U.S. Cl.
USPC ........................................................ 720/710

(58) Field of Classification Search
USPC ..................... 720/703–704, 706–707, 710
See application file for complete search history.

(56) References Cited

U.S. PATENT DOCUMENTS

| | | | |
|---|---|---|---|
| 5,457,676 A * | 10/1995 | Park | 720/710 |
| 6,252,842 B1 * | 6/2001 | Mukawa | 720/712 |
| 8,139,317 B2 * | 3/2012 | Okinaga et al. | 360/99.04 |
| 2003/0107983 A1 * | 6/2003 | Kim et al. | 369/270 |

FOREIGN PATENT DOCUMENTS

| | | | |
|---|---|---|---|
| JP | 04085751 A * | 3/1992 | |
| JP | 04281256 A * | 10/1992 | |
| JP | 04289556 A * | 10/1992 | |
| JP | A-04-313858 | 11/1992 | |
| JP | A-06-89490 | 3/1994 | |
| JP | 2000123450 A * | 4/2000 | |
| JP | 2001014763 A * | 1/2001 | |
| JP | A-2001-14763 | 1/2001 | |
| JP | A-2001-37141 | 2/2001 | |
| JP | A-2001-84687 | 3/2001 | |
| JP | 2002-197762 A | 7/2002 | |
| JP | 2003030914 A * | 1/2003 | |

(Continued)

OTHER PUBLICATIONS

May 18, 2010 International Search Report issued in International Patent Application No. PCT/JP2010/001497 (with translation).

(Continued)

*Primary Examiner* — Will J Klimowicz
(74) *Attorney, Agent, or Firm* — Oliff PLC

(57) ABSTRACT

There is provided a disk clamping mechanism that supports a disk on a turntable unit under pressure by an attractive force produced between a clamping magnet and a damper constituted in a rotor unit, wherein the clamping magnet is directly fixed at the upper surface of a rotor frame including the turntable unit, and further, the upper surface of the clamping magnet is covered with a centering member for centering the disk.

2 Claims, 5 Drawing Sheets

(56) References Cited

FOREIGN PATENT DOCUMENTS

| JP | 2003-059147 A | | 2/2003 |
|----|---------------|---|--------|
| JP | 2003-157602 A | | 5/2003 |
| JP | A-2004-56930 | | 2/2004 |
| JP | A-2006-127625 | | 5/2006 |
| JP | 2006202489 A | * | 8/2006 |
| JP | B2-3852763 | | 12/2006 |
| JP | 2008108311 A | * | 5/2008 |
| KR | 2002095337 A | * | 12/2002 |

OTHER PUBLICATIONS

Japanese Office Action in Application No. 2009-233305 mailed Jul. 16, 2013.

* cited by examiner

PRIOR ART

PRIOR ART

DISK CLAMPING MECHANISM AND DISK ROTATING MOTOR PROVIDED WITH SAME

TECHNICAL FIELD

The present invention relates to a disk rotating motor for a disk drive device that records information on a music composition or a video image in an optical medium such as a CD or a DVD or plays the recorded information and, more particularly, to a disk clamping mechanism that holds a disk in the center.

BACKGROUND ART

Such a disk drive device has recently required miniaturization, thinness, high performance, a low cost, and the like. In addition, when the disk drive device is used on a vehicle, it has required clamping reliability, vibration resistance, shock resistance, and dust resistance. In connection with this, a disk clamping mechanism becomes more important to stably hold the disk such that a disk rotating motor that supports and rotates an optical medium meets the above-described requirements.

A clamping mechanism that holds the disk in a turntable unit under pressure by the force of a spring disposed in a damper mounting mechanism was mainstream in a vehicle-mounted use of the disk clamping mechanism. However, a disk clamping mechanism by the use of a magnet attractive force that can secure a high disk holding force has been mainstream because the accuracy of equipment becomes high according to a recent increase in recording capacity (see, for example, Patent Document 1).

FIG. 2 shows a disk rotating motor and a disk clamping mechanism in the related art disclosed in Patent Document 1.

As shown in FIG. 2, the conventional disk clamping mechanism is provided with a centering member 103, a clamping magnet 104, and a back yoke 105. Centering member 103 is adapted to hold an inner diameter portion 102 of a disk 101. Clamping magnet 104 is contained in centering member 103. Back yoke 105 is disposed so as to secure a magnetic flux of clamping magnet 104. The disk clamping mechanism is fixed at the center of a turntable unit 107 having a rubber sheet 106, serving as a disk mounting surface, stuck thereto. A damper 109 containing a magnet 108 therein and rubber sheet 106 hold disk 101, thereby achieving stable holding.

As for clamping a back yoke in the disk clamping mechanism, there has been further conventionally proposed the following techniques. For example, a back yoke 110 is molded integrally with a centering member 111 in a disk rotating motor in the related art shown in FIG. 3 (see, for example, Patent Document 2). A back yoke 112 is securely press-fitted into a shaft 113 in a disk rotating motor in the related art shown in FIG. 4 (see, for example, Patent Document 3). A back yoke 114 is incorporated and fitted via an engaging portion 115 formed in a centering member in a disk clamping structure in the related art shown in FIG. 5 (see, for example, Patent Document 4).

Moreover, apart from the above-described related art, there has been proposed a structure, in which a magnet is directly mounted on a turntable unit, and further, the turntable unit is used also as a back yoke (see, for example, Patent Document 5).

FIG. 6 shows a disk rotating motor and a disk clamping mechanism disclosed in the related art in Patent Document 5.

As shown in FIG. 6, a magnet 117 is constituted integrally with a disk 116. In the meantime, a clamping magnet 119 is mounted directly on a metallic turntable unit 118. Disk 116 is configured to be securely pressed against a side wall 120 of turntable unit 118 by the attractive force of magnet 117 and clamping magnet 119. In this manner, turntable unit 118 serves also as a back yoke.

However, with the configuration disclosed in Patent Document 1, a method for fixing the magnet and the back yoke is not obvious. Assuming fixing via bonding, clamping reliability and shock resistance are poor in severe use environment during a vehicle-mounted use. Additionally, the upper plane of the magnet is exposed, and therefore, a magnetic member may possibly attract minute foreign matters, thereby making it difficult to secure dust resistance.

With the configuration disclosed in Patent Document 2, the back yoke is molded integrally with the centering member, thus achieving high clamping reliability and high shock resistance. However, integral molding is relatively expensive in the market that requires a lower cost, and therefore, the configuration is disadvantageous from the viewpoint of a cost. In addition, in the case where a temperature shock peculiar to a vehicle-mounted use is applied in a wide range, an excessive stress is concentrated on the centering member due to a difference in thermal expansion coefficient between the materials of the centering member and the back yoke, thereby raising a possibility of occurrence of a crack.

With the configuration disclosed in Patent Document 3, the back yoke is press-fitted and clamped to a rotary shaft, and therefore, clamping reliability and shock resistance are high. However, the back yoke requires a constant or greater thickness in order to secure press-fitting strength. This has no other choice but to be a disadvantageous structure for the disk rotating motor requiring miniaturization and thinness.

With the configuration disclosed in Patent Document 4, the back yoke is securely engaged, and therefore, clamping reliability and shock resistance are high. However, its structure becomes complicated, so that not only component parts require high precision but also man-hours needed to assembly are increased. As a consequence, it is disadvantageous from the viewpoint of a cost.

With the configurations disclosed in Patent Document 2 to 4 in the same manner as the configuration disclosed in Patent Document 1, the upper plane of the magnet is exposed, and therefore, the magnetic member may attract minute foreign matters, thereby making it difficult to secure dust resistance.

Furthermore, with the configuration disclosed in Patent Document 5, since the magnet is mounted directly on the turntable unit, it is free from a problem to be solved of clamping the back yoke, and further, a member dedicated to the back yoke is unnecessary. Consequently, the number of component parts can be reduced, and therefore, it is advantageous from the viewpoint of a cost. However, in the same manner as the configurations disclosed in Patent Document 1 to 4, the degradation of dust resistance could not be overcome.

PRIOR ART DOCUMENT

Patent Document

Patent Document 1: Japanese Patent Laying-Open No. 2006-127625
Patent Document 2: Japanese Patent Laying-Open No. 2001-37141
Patent Document 3: Japanese Patent Laying-Open No. 2004-56930
Patent Document 4: Japanese Patent No. 3852763

Patent Document 5: Japanese Patent Laying-Open No. 4-313858

SUMMARY OF THE INVENTION

The present invention relates to a disk clamping mechanism that supports a disk on a turntable unit under pressure by an attractive force produced between a clamping magnet and a damper constituted in a rotor unit. Here, the clamping magnet is directly fixed at the upper surface of a rotor frame including the turntable unit, and further, the upper surface of the clamping magnet is covered with a centering member for centering the disk.

According to the present invention, the turntable unit of the rotor frame fulfills the function of a back yoke. As a consequence, the number of component parts can be reduced, and therefore, it is advantageous from the viewpoint of a cost. Additionally, there is no back yoke, thereby bringing advantages to a size and a thickness and achieving high clamping reliability. Furthermore, the clamping magnet is covered with the centering member, so that dust resistance is excellent without any adhesion of foreign matters, and further, reliability to shock resistance is high since there is no occurrence of falling of the clamping magnet.

MODES FOR CARRYING OUT THE INVENTION

An embodiment according to the present invention will be described below with reference to the attached drawings.
(Embodiment)

Figure 1:
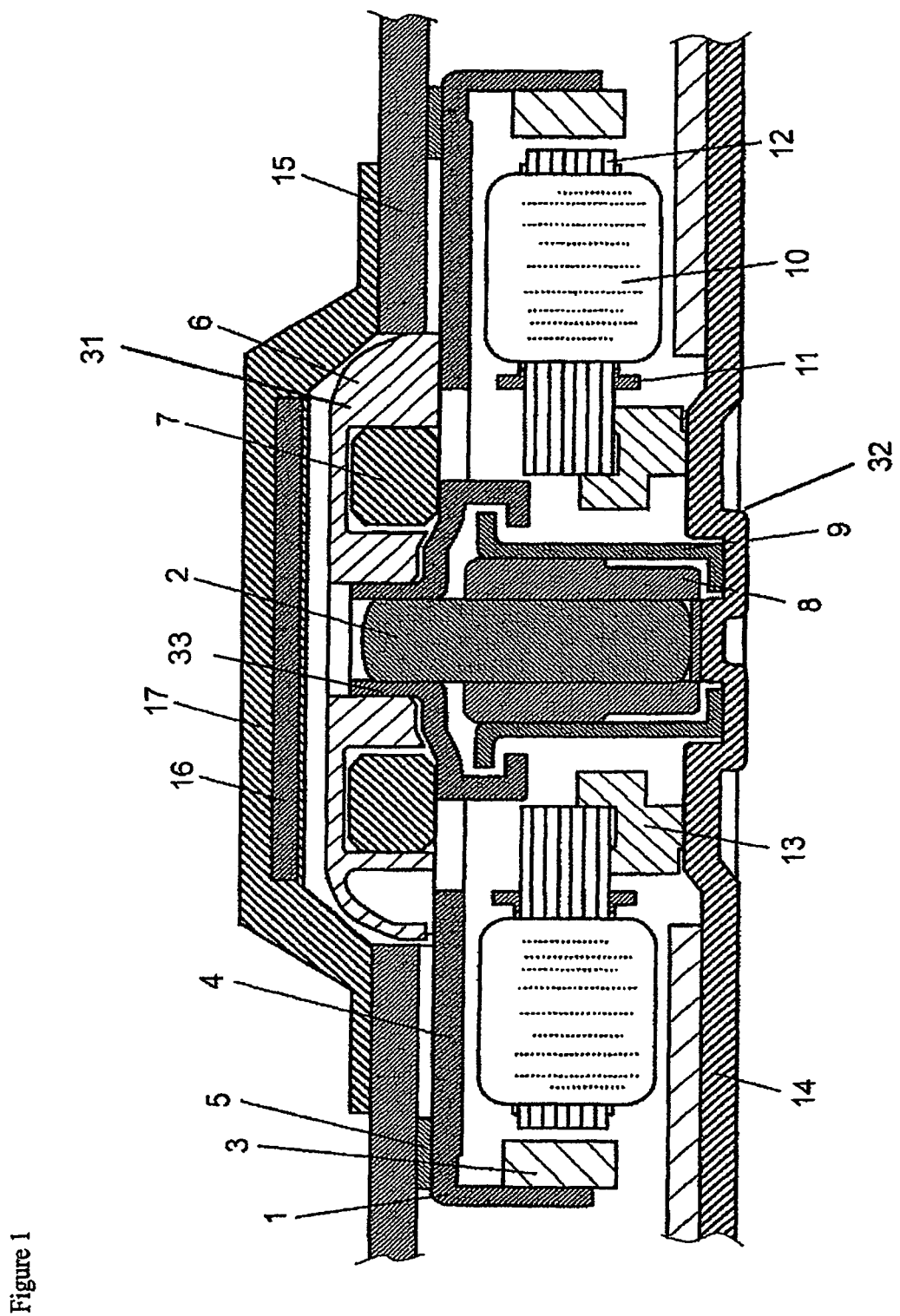
FIG. 1 is a cross-sectional view showing a disk rotating motor in an embodiment according to the present invention.
Figure 2:
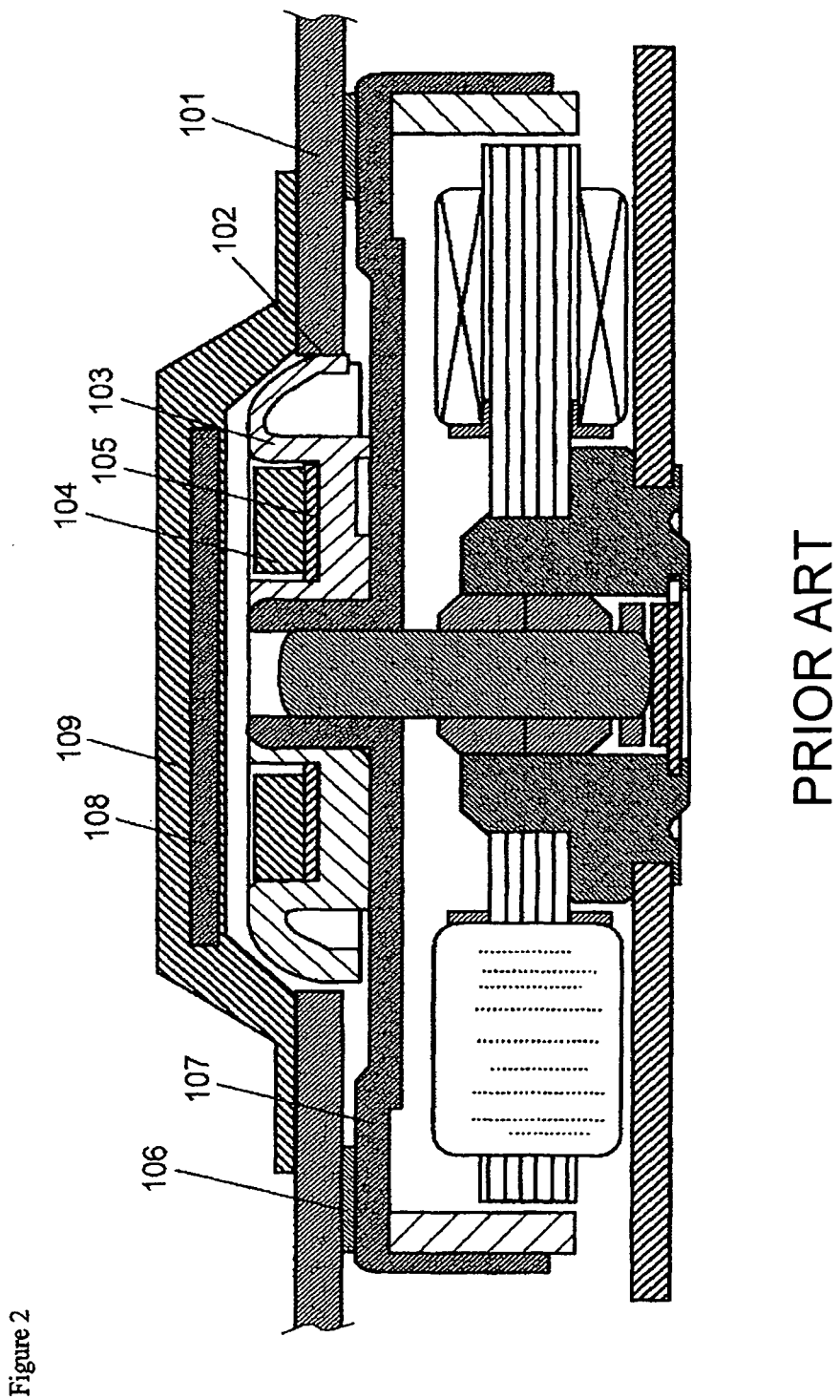
FIG. 2 is a cross-sectional view showing a disk rotating motor in the related art.
Figure 3:
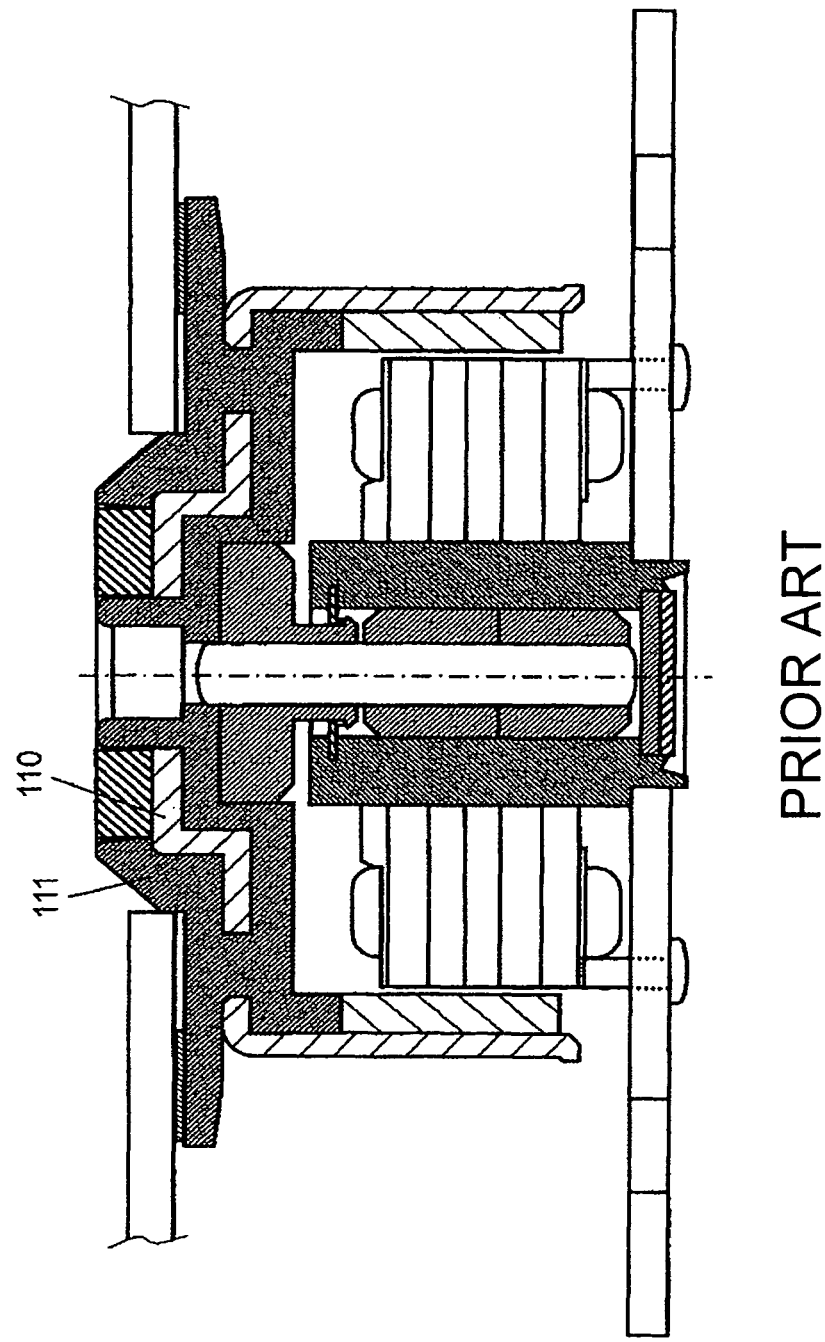
FIG. 3 is a cross-sectional view showing another disk rotating motor in the related art.
Figure 4:
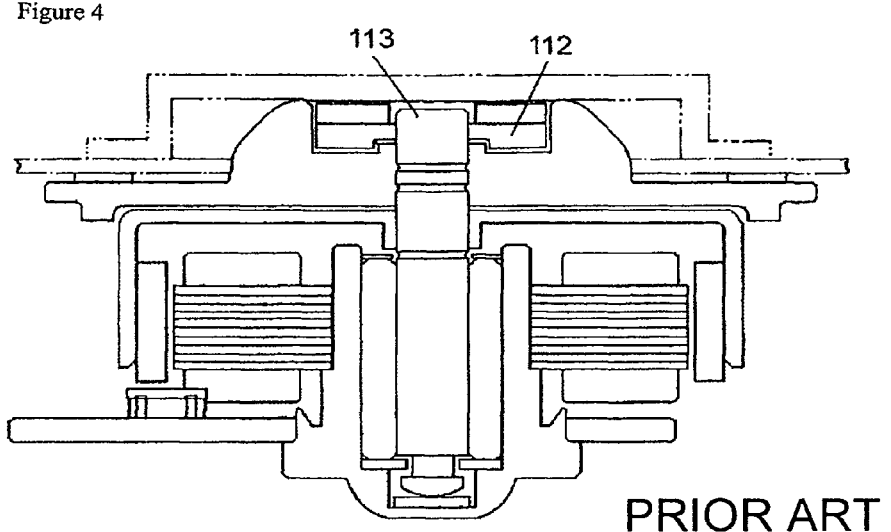
FIG. 4 is a cross-sectional view showing a further disk rotating motor in the related art.
Figure 5:
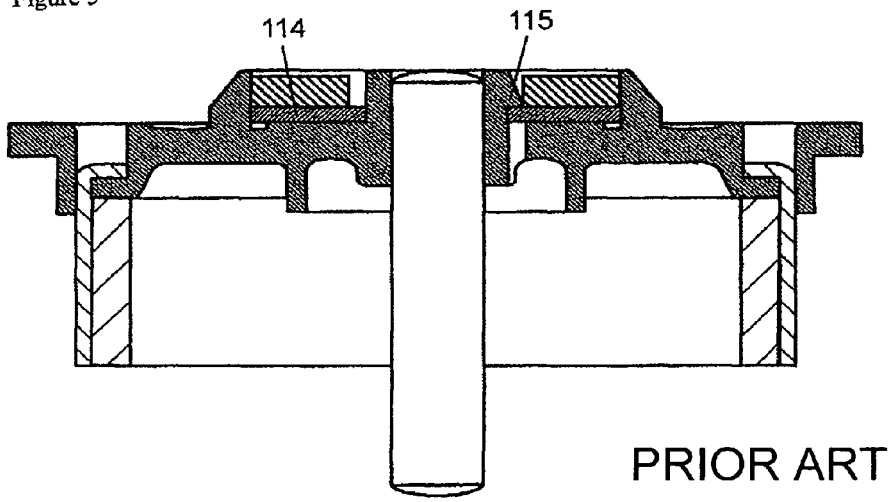
FIG. 5 is a cross-sectional view showing a disk clamping structure in the related art.
Figure 6:
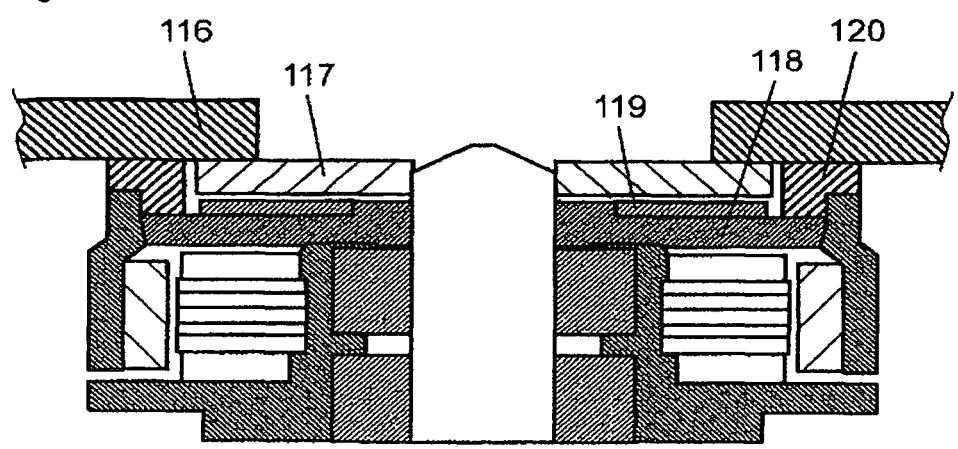
FIG. 6 is a cross-sectional view showing another disk clamping structure in the related art.

FIG. 1 is a cross-sectional view showing a disk rotating motor in an embodiment according to the present invention.

As shown in FIG. 1, the disk rotating motor is constituted of a rotor assembly 31 serving as a rotor unit and a stator assembly 32 serving as a stator unit.

Rotor assembly 31 includes a rotor frame 1, a shaft 2, a center projection 33, a rotor magnet 3, a rubber sheet 5, a centering member 6, and a clamping magnet 7.

Rotor frame 1 is made of a metal and is formed into a substantially U shape. Shaft 2 is fixed to rotor frame 1. Ring-like rotor magnet 3 is secured to the inner circumference of a cylindrical portion of rotor frame 1. Rubber sheet 5 is applied to a turntable unit 4 on a circular plane at the upper surface of rotor frame 1.

Moreover, rotor assembly 31 is provided with centering member 6 that is formed into a substantially cylindrical shape, so as to center the inner diameter of a disk. Centering member 6 contains clamping magnet 7 therein. Clamping magnet 7 is provided for stably holding the disk by the attractive force of the magnet. In the present embodiment, clamping magnet 7 is located directly at the upper surface of rotor frame 1 and at the center of turntable unit 4 by direct fixing via an adhesive or the like. Clamping magnet 7 is covered with centering member 6. In other words, the upper surface of clamping magnet 7 is covered with centering member 6, and clamping magnet 7 is not exposed to the outside. It is preferable to configure the structure such that centering member 6 tightly seals clamping magnet 7 without any clearance between rotor frame 1 and centering member 6. Here, centering member 6 is securely press-fitted to a center projection of turntable unit 4. Since clamping magnet 7 is fixed at the upper surface of metallic rotor frame 1, rotor frame 1 functions also as a back yoke for securing a magnetic flux of clamping magnet 7.

Stator assembly 32 is provided with a bearing 8, a bearing housing 9, a coil wire 10, a stator core 12, a core holder 13, and a bracket 14.

Bearing 8 rotatably bears shaft 2. Bearing housing 9 is formed into a cylindrical shape, and is adapted to hold bearing 8 on the inner circumferential side thereof. Bracket 14 has a recess and bearing housing 9 is contained in the recess. Stator core 12 is disposed on the inner circumferential side of rotor frame 1 oppositely to rotor magnet 3. Coil wire 10 is wound around stator core 12 via an insulating member 11. Stator core 12 is held by core holder 13.

The disk rotating motor is further provided with a damper 17 in order to secure a disk holding force. Specifically, as shown in FIG. 1, a disk 15 of an optical medium such as a CD or a DVD is fitted to centering member 6 of the disk rotating motor. Clamper 17 is positioned above centering member 6. Clamper 17 contains therein a magnet 16 for attracting clamping magnet 7.

In the disk rotating motor such configured as described above, disk 15 is fitted to centering member 6 in such a manner as to be mounted on rubber sheet 5, thereby holding disk 15 between rubber sheet 5 and damper 17. At this time, magnet 16 in damper 17 and clamping magnet 7 attract each other by magnetic force. In this manner, the disk holding force is secured by a pressing force produced when damper 17 is attracted to clamping magnet 7 in the present embodiment. Incidentally, damper 17 is disposed in a disk drive device, not shown, for fixing the disk rotating motor.

In this manner, a disk clamping mechanism is constituted such that disk 15 is supported on turntable unit 4 under pressure by the attractive force produced between clamping magnet 7 and damper 17 of rotor assembly 31.

In the disk clamping mechanism in the present embodiment, clamping magnet 7 is directly mounted at the upper surface of rotor frame 1 including turntable unit 4, and further, the upper surface of clamping magnet 7 is covered with centering member 6 for centering the disk.

With the above-described configuration, the disk clamping mechanism need not be provided with any back yoke for the clamping magnet because turntable unit 4 of rotor frame 1 fulfills the function of a back yoke. As a consequence, the number of component parts can be reduced, and therefore, it is advantageous from the viewpoint of a cost. Additionally, there is no back yoke, thereby bringing advantages to the size and the thickness and achieving the high clamping reliability. Furthermore, the disk clamping mechanism has the structure in which clamping magnet 7 is covered by, for example, tightly sealing clamping magnet 7 with centering member 6, so that dust resistance is excellent without any adhesion of foreign matters, and further, the reliability to shock resistance is high since there is no occurrence of falling of clamping magnet 7.

As described above, in the disk clamping mechanism according to the present invention, the clamping magnet is directly mounted at the upper surface of the rotor frame including the turntable unit, and further, the upper surface of the clamping magnet is covered with the centering member for centering the disk. Moreover, the disk rotating motor according to the present invention is provided with the disk clamping mechanism.

With the above-described configuration, the turntable unit of the rotor frame fulfills the function of a back yoke according to the present invention. As a consequence, the number of component parts can be reduced, and therefore, it is advantageous from the viewpoint of a cost. Additionally, there is no back yoke, thereby bringing advantages to the size and the thickness and achieving the high clamping reliability. Furthermore, the clamping magnet is tightly sealed, so that the dust resistance is excellent without any adhesion of foreign matters, and further, the reliability to the shock resistance is high since there is no occurrence of falling of the clamping magnet.

Industrial Applicability

The present invention is useful for a PC disk drive, AV equipment, or the disk drive device represented by a car navigation or a car audio, which are for recording or playing the information on a music composition or a video image in an optical medium such as a CD or a DVD that requires the clamping reliability, the vibration resistance, the shock resistance, and the dust resistance in addition to the miniaturization, the thinness, the high performance, and the low cost.

Explanation of Reference Numerals 1 rotor frame
2, 113 shaft
3 rotor magnet
4, 107, 118 turntable unit
5, 106 rubber sheet
6, 103, 111 centering member
7, 104, 119 clamping magnet
8 bearing
9 bearing housing
10 coil wire
11 insulating member
12 stator core
13 core holder
14 bracket
15, 101, 116 disk
16, 108, 117 magnet
17, 109 damper
31 rotor assembly
32 stator assembly
102 inner diameter portion
105, 110, 112, 114 back yoke
115 engaging portion
120 side wall

The invention claimed is:

1. A disk clamping mechanism that supports a disk on a turntable unit under pressure by an attractive force produced between a clamping magnet and a clamper constituted in a rotor unit,
wherein the rotor unit includes a rotor magnet disposed opposite to a stator core, and a rotor frame having an inner circumference, the rotor magnet secured to the inner circumference of the rotor frame, and
said clamping magnet is directly fixed at the upper surface of the rotor frame including the turntable unit, and further, the upper surface of said clamping magnet is covered with a centering member for centering the disk, the centering member being securely press-fitted to a center projection of the turntable unit.

2. A disk rotating motor comprising the disk clamping mechanism according to claim 1.

* * * * *